(12) United States Patent
Tazaki

(10) Patent No.: US 6,984,829 B2
(45) Date of Patent: Jan. 10, 2006

(54) RADIATION IMAGE STORAGE PANEL

(75) Inventor: Seiji Tazaki, Kanagawa (JP)

(73) Assignee: Fuji Film Co., Ltd., Kanagawa (JP)

( * ) Notice: Subject to any disclaimer, the term of this patent is extended or adjusted under 35 U.S.C. 154(b) by 0 days.

(21) Appl. No.: 10/917,283

(22) Filed: Aug. 13, 2004

(65) Prior Publication Data

US 2005/0051735 A1 Mar. 10, 2005

(30) Foreign Application Priority Data

Aug. 13, 2003 (JP) .............................. 2003-293102

(51) Int. Cl.
 *G03B 42/08* (2006.01)
(52) U.S. Cl. .................................. 250/484.4
(58) Field of Classification Search ............. 250/484.4, 250/484.2, 483.1, 472.1
 See application file for complete search history.

(56) References Cited

U.S. PATENT DOCUMENTS

| 4,489,154 | A | * | 12/1984 | Taylor, Jr. ................... 430/253 |
| 6,396,066 | B1 | * | 5/2002 | Chen et al. .............. 250/488.1 |
| 2002/0158216 | A1 | * | 10/2002 | Neriishi et al. ............. 250/584 |
| 2003/0138599 | A1 | * | 7/2003 | Kamikubo ................. 428/141 |
| 2004/0070328 | A1 | * | 4/2004 | Van den Bergh et al. ... 313/461 |
| 2004/0104363 | A1 | * | 6/2004 | Suzuki ....................... 250/584 |

* cited by examiner

*Primary Examiner*—David Porta
*Assistant Examiner*—Marcus Taningco
(74) *Attorney, Agent, or Firm*—Sughrue Mion, PLLC

(57) ABSTRACT

A radiation image storage panel has a support, an energy-storing phosphor layer, and a protective sheet overlaid in order, in which the protective sheet has a 25% compression hardness in the range of 0.005 to 0.4 MPa and is releasable from the phosphor layer without giving damage to the phosphor layer.

10 Claims, 2 Drawing Sheets

RADIATION IMAGE STORAGE PANEL

FIELD OF THE INVENTION

The present invention relates to a radiation image storage panel employable in a radiation image recording and reproducing method which utilizes an energy-storing phosphor.

BACKGROUND OF THE INVENTION

When an energy-storing phosphor (e.g., stimulable phosphor, which produces stimulated emission) exposed to radiation such as X-rays, it absorbs and stores a portion of the radiation energy. The phosphor then emits stimulated emission according to the level of the stored energy when it is exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the storage panel; sequentially scanning the storage panel with a stimulating light such as a laser beam to emit a stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and an energy-storing phosphor layer provided thereon. However, if the phosphor layer is self-supporting, the support may be omitted. Further, a protective layer is ordinarily provided on the free surface (surface not facing the support) of the phosphor layer to keep the phosphor layer from chemical deterioration or physical damage.

The phosphor layer usually comprises a binder and an energy-storing phosphor dispersed therein. However, the phosphor layer may comprise agglomerate of an energy-storing phosphor without binder. The phosphor layer containing no binder can be formed by a vapor phase deposition procedure or by a firing procedure. Further, the phosphor layer may comprise energy-storing phosphor agglomerate impregnated with a polymer material.

Japanese Patent Provisional Publication 2001-255610 discloses a variation of the radiation image recording and reproducing method. While an energy-storing phosphor of the storage panel used in the ordinary method plays both roles of radiation-absorbing function and energy-storing function, those two functions are separated in the disclosed method. In the method, a radiation image storage panel comprising an energy-storing phosphor (which stores radiation energy) is used in combination with a phosphor screen comprising another phosphor which absorbs radiation and emits ultraviolet or visible light. The disclosed method comprises the steps of causing the radiation-absorbing phosphor of the screen (and of the storage panel) to absorb and convert radiation having passed through an object or having radiated from an object into ultraviolet or visible light; causing the energy-storing phosphor of the storage panel to store the energy of the converted light as radiation image information; sequentially exciting the energy-storing phosphor with a stimulating light to emit stimulated light; and photoelectrically detecting the emitted light to obtain electric signals giving a visible radiation image.

The radiation image recording and reproducing method (or radiation image forming method) has various advantages as described above. However, it is still desired that the radiation image storage panel used in the method show as high sensitivity as possible and, at the same time, give a reproduced radiation image of high quality (particularly, in regard to sharpness and graininess).

In reading out radiation image information from the radiation image storage panel, line-scanning is often adopted. The system of line-scanning ordinarily comprises a condenser lens (e.g., distributed index lens array) and a line sensor in combination. Light emitted from the storage panel is focused through the condenser lens onto a photo-receiving face of the line sensor, and the line sensor detects and photoelectrically converts the emission into electric signals. Accordingly, it is important to prevent the storage panel from bending and to keep the storage panel such level that the distance between the lens and the panel surface is kept within the depth of focus. In consideration of these requirements, it has been proposed to provide a rigid plate or support onto one or both sides of the phosphor layer.

Meanwhile, in producing the radiation image storage panel, an energy-storing phosphor layer and a protective layer are often formed on a continuous support, and then other steps such as a step of cutting, a step of placing other sheets or layers and/or a step of attaching a rigid plate are carried out. It is now found that if these post-treatment steps are carried out without covering or protecting the phosphor and protective layers, the surface of the phosphor or protective layer (namely, the panel surface on the side from which the image information is read out) is often scratched or bruised because the layers are locally rubbed or pressed when handled or treated in the above steps. As a result, the reproduced radiation image obtained in the radiation image storing and reproducing procedure is often impaired. Further, the surface is also bruised by dust (such as waste fragments of the phosphor) attaching thereonto.

Furthermore, the manufactured storage panel may be rubbed or scratched when packed, transported or stored, so the surface of the storage panel may be damaged. In addition, when the storage panel is installed in a built-in type radiation image information recording and reproducing apparatus (which is equipped with a built-in panel), the surface of the storage panel is, if not protected, often damaged during the installation.

SUMMARY OF THE INVENTION

It is an object of the present invention to provide a radiation image storage panel improved in resistance to scratches and bruises often caused when the storage panel is produced, packed, transported, stored or installed in the apparatus.

The applicant has studied about the above-mentioned problems, and finally has found that the radiation image storage panel can be effectively protected from scratches and bruises by providing a protective sheet having an appropriate hard surface and being separable from the phosphor layer without giving damage to the phosphor layer and. According to the invention, after the step of forming the phosphor layer on a support (and ordinarily after the step of forming the protective layer on the phosphor layer) in producing the storage panel, the protective sheet is further provided thereon. Thus provided protective sheet can effectively keep the storage panel from scratches and bruises caused in the producing steps or when the storage panel is packed, transported, stored or installed in the apparatus.

The present invention resides in a radiation image storage panel comprising a flexible support, an energy-storing phosphor layer, and a protective sheet overlaid in order, wherein the protective sheet has a 25% compression hardness in the range of 0.005 to 0.4 MPa and is releasable from the phosphor layer without giving damage to the phosphor layer.

The invention further resides in a radiation image storage panel comprising a rigid plate, a flexible support, an energy-storing phosphor layer, and a protective sheet overlaid in order, wherein the protective sheet has a 25% compression hardness in the range of 0.005 to 0.4 MPa and is releasable from the phosphor layer without giving damage to the phosphor layer.

The invention furthermore resides in a radiation image storage panel comprising a rigid support, an energy-storing phosphor layer, and a protective sheet overlaied in order, wherein the protective sheet has a 25% compression hardness in the range of 0.005 to 0.4 MPa and is releasable from the phosphor layer without giving damage to the phosphor layer.

The above-mentioned radiation image storage panel is preferably manufactured by one of the following processes.

(1) A process comprising the steps of: laminating a protective sheet having a 25% compression hardness in the range of 0.005 to 0.4 MPa on the phosphor layer-side surface of a phosphor sheet comprising a flexible and an energy-storing phosphor layer provided thereon; fixing a rigid plate to the flexible support on the reverse side while keeping the protective sheet laminated on the opposite surface, and combining the protective sheet and the rigid plate utilizing an adhesive tape.

(2) A process comprising the steps of: pladcing via an adhesive layer, a continuous protective sheet having a 25% compression hardness in the range of 0.005 to 0.4 MPa on the phosphor layer-side surface of a continuous phosphor sheet comprising a support and an energy-storing phosphor layer provided thereon; cutting laterally the continuous phosphor sheet provided with the protective sheet; and fixing a rigid plate to the support utilizing an adhesive layer.

In the present invention, the "25% compression hardness" means that defined in JIS-K-6767.

The radiation image storage panel of the invention is equipped with an easily releasable protective sheet, which well protects the phosphor layer from scratches and bruises caused when the storage panel is packed, transported, stored or installed in the apparatus of built-in type. The radiation image storage panel of the invention, therefore, can give a good reproduced radiation image without impairing image quality.

DETAILED DESCRIPTION OF THE INVENTION

Preferred embodiments of the radiation image storage panel according to the invention are as follows.

(1) A transparent protective layer firmly bonded to the energy-storing phosphor layer is provided between the phosphor layer and the protective sheet.

(2) The protective sheet is made of elastic material or foamed resin.

(3) The protective sheet is a sheet of elastic material, foamed elastic material, foamed polyurethane, or foamed polyolefin such as foamed polyethylene.

(4) The protective sheet has a thickness in the range of 0.5 to 5 mm.

(5) The protective sheet is fixed onto the phosphor layer-side surface via an adhesive layer releasable together with the protective sheet.

(6) Both of the protective sheet and the rigid plate are larger than each of the support and the phosphor layer under such conditions that peripheral areas of the protective sheet and rigid plate extend beyond peripheries of the support and phosphor layer, and the protective sheet and the rigid plate are combined using an adhesive tape placed on the peripheral areas.

(7) Both of the protective sheet and the rigid support are larger than the phosphor layer under such conditions that peripheral areas of the protective sheet and rigid support extend beyond periphery of the phosphor layer, and the protective sheet and the rigid support are combined using an adhesive tape placed on the peripheral areas.

(8) The radiation image storage panel comprises a rigid plate, a flexible support, an energy-storing phosphor layer, a transparent protective layer, and a protective sheet, overlaid in order.

(9) The radiation image storage panel comprises a rigid support, an energy-storing phosphor layer, a transparent protective layer, and a protective sheet, overlaid in this order.

In the following description, the radiation image storage panel of the invention is explained in detail referring to the attached drawings.

Figure 1:
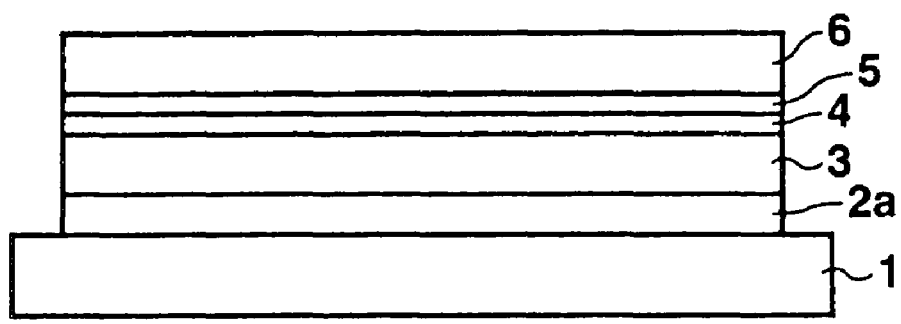
FIG. 1 is a sectional view schematically illustrating an example of the structure of radiation image storage panel according to the invention.

FIG. 1 is a sectional view schematically illustrating an example of the structure of radiation image storage panel according to the invention. The storage panel of FIG. 1 comprises a rigid plate 1, a flexible support 2a, an energy-storing phosphor layer 3, a transparent protective layer 4, a releasable adhesive layer 5, and a protective sheet 6, overlaied in order. The protective sheet 6 is fixed on the protective layer 4 via the adhesive layer 5, and can be separated from the protective layer 4 together with the adhesive layer 5 without giving damage to the phosphor layer 3.

The protective sheet 6 has a 25% compression hardness (which is defined in JIS-K-6767) in the range of 0.005 to 0.4 MPa. The protective sheet 6 having a 25% compression hardness in that range can protect, from scratches and bruises, the surface of the transparent protective layer 4 (or the surface of the energy-storing phosphor layer 3 if the protective layer 4 is not provided), namely, the panel surface on the side from which image information is read out. If the 25% compression hardness is smaller than that range (namely, if the protective sheet is too soft), it is difficult to appropriately handle the protective sheet and accordingly it is necessary to increase the thickness of the protective sheet. If so, troubles are liable to occur when the storage panel having the thick protective sheet is installed in a radiation image-converting system. In contrast, if the 25% compression hardness is larger than the above range (namely, if the protective sheet is too hard), foreign substance such as dust inadvertently placed between the protective layer (or the phosphor layer) and the protective sheet is prone to bruise the surface of the protective layer or the phosphor layer. That is because the hard protective sheet can not absorb the thickness of the foreign substance.

The protective sheet preferably is light weighted enough to treat easily. It can be made of, for example, elastic material or foamed resin. Examples of materials of the protective sheet include foamed polyurethane, foamed polyolefin such as foamed polyethylene, sponge rubber, and rubber. From the viewpoint of impact resistance, sheets of foamed polyurethane and foamed polyolefin are preferably used. Although it depends upon the material, the thickness of the protective sheet generally is in the range of 0.5 to 5 mm.

Figure 2:
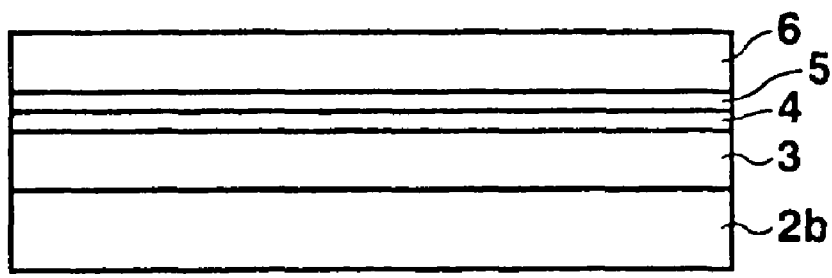
FIG. 2 is a sectional view schematically illustrating another example of the structure of radiation image storage panel according to the invention.

FIG. 2 is a sectional view schematically illustrating another radiation image storage panel of the invention. The storage panel of FIG. 2 comprises a rigid support $2b$, an energy-storing phosphor layer 3, a transparent protective layer 4, a releasable adhesive layer 5, and a protective sheet 6. The protective sheet 6 is fixed onto the protective layer 4 via the adhesive layer 5, and can be separated from the protective layer 4 together with the adhesive layer 5 without giving damage to the phosphor layer 3.

Figure 3:
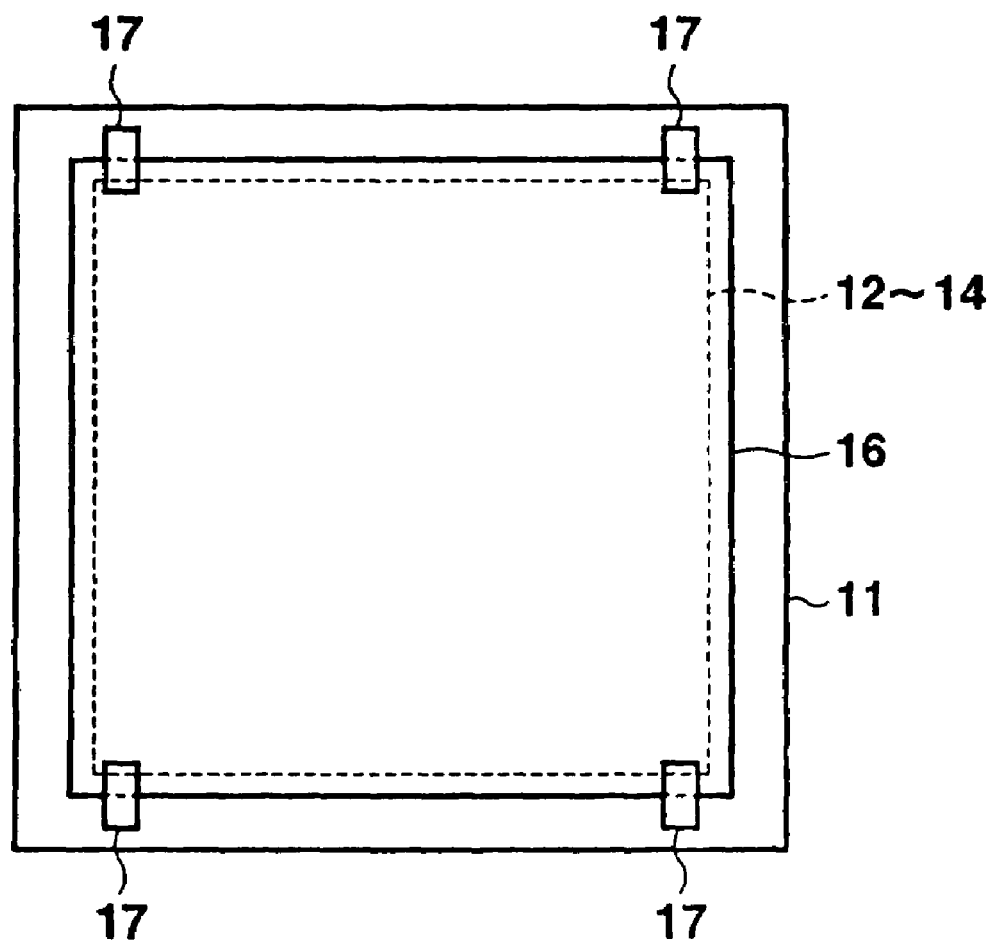
FIG. 3 is a plan view illustrating an example of radiation image storage panel according to the invention.

FIG. 3 is a plan view illustrating still another radiation image storage panel of the invention. The storage panel of FIG. 3 comprises a rigid plate 11, a flexible support, an energy-storing phosphor layer, a transparent protective layer (12–14), and a protective sheet 16, overlayed in order. The protective layer 14 is fully covered with the protective sheet 16, which is fixed onto the rigid plate 11 with a peelable adhesive tape 17. The protective sheet 16 can be separated by peeling the adhesive tape 17 off the rigid plate 11 and the protective sheet 16.

The releasable protective sheet thus provided on the read out-side surface of the storage panel can protect the storage panel from scratches and bruises caused when the storage panel is packed, transported, stored or installed in the apparatus of built-in type, and thereby ensures quality of reproduced radiation images. In addition, the protective sheet can keep the storage panel from scratches and bruises brought about in the producing steps and subsequet steps in which the storage panel is liable to be locally rubbed or pressed when handled or treated. Further, even if fine dusts are placed on the surface of the protective or phosphor layer, the protective sheet dents to absorb the thickness of the dusts so that the dust may not bruise the phosphor surface. Furthermore, since the protective sheet is unified with the storage panel via the adhesive layer or the adhesive tape, the protective sheet does not move and rub against the panel surface to cause scratches and is easily handled in the producing steps.

The protective sheet can be easily separated from the phosphor layer or transparent protective layer (or film) when it becomes unnecessary. For example, after the storage panel is installed in the read-out apparatus, the protective sheet can be separated.

The process for producing the radiation image storage panel of the invention is described below in detail.

The flexible support ordinarily is a continuous sheet or film having a thickness of 50 $\mu$m to 1 mm and made of soft resin. The support may be transparent, may contain light-reflecting material (e.g., particles of alumina, titanium dioxide and barium sulfate) or voids for reflecting the stimulating light or the emission, or may contain light-absorbing material (carbon black) for absorbing the stimulating light or the emission. Examples of resin materials employable for the production of the support include polyethylene terephthalate, polyethylene naphthalate, aramide resin and polyimide resin. For improving the sharpness of the resultant image, fine concaves and convexes may be formed on the phosphor layer-side surface of the support (or on the phosphor layer-side surface of the auxiliary layer such as the subbing layer, the light-reflecting layer or the light-absorbing layer, if it is provided).

On the continuous support, if desired, a light-reflecting layer containing light-reflecting material such as alumina, titanium dioxide and barium sulfate or a light-absorbing layer containing light-absorbing material such as carbon black may be provided for improving sensitivity of the storage panel or quality (particularly, in regard of sharpness and graininess) of the reproduced radiation image. Further, for enhancing adhesion onto the layer provided thereon, a subbing layer (adhesive layer) may be formed.

On the support, a phosphor layer comprising energy-storing phosphor is provided. The energy-storing phosphor is preferably a stimulable phosphor giving off stimulated emission in the wavelength region of 300 to 500 nm when exposed to a stimulating ray in the wavelength region of 400 to 900 nm. Examples of the stimulable phosphor are described in detail in Japanese Patent Publications 7-84588B, 2-193100A and 4-310900A.

The phosphor is particularly preferably an alkali metal halide stimulable phosphor represented by the following formula (I):

$$M^I X \cdot aM^{II}X'_2 \cdot bM^{III}X''_3 : zA \qquad (I).$$

In the formula (I), $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Na, Mg, Cu, Ag, Tl and Bi; and a, b and z are numbers satisfying the conditions of $0 \leq a < 0.5$, $0 \leq b < 0.5$ and $0 \leq z < 0.2$, respectively.

In the formula (I), $M^I$ preferably comprises at least Cs, X preferably comprises at least Br, and A is preferably Eu or Bi. The phosphor represented by the formula (I) may further comprise, if needed, metal oxides such as aluminum oxide, silicone dioxide and zirconium oxide as additives in an amount of 0.5 mol or less based on 1 mol of $M^I$.

As the phosphor, it is also preferred to use a rare earth activated alkaline earth metal fluoride halide stimulable phosphor represented by the following formula (II):

$$M^{II}FX:aLn \qquad (II)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), $M^{II}$ preferably comprises Ba more than half of the total amount of $M^{II}$, and Ln is preferably Eu or Ce. The $M^{II}FX$ in the formula (II) represents a matrix crystal structure of BaFX type, and it by no means indicates stoichiometrical composition of the phosphor. Accordingly, the molar ratio of F:X is not always 1:1. It is generally preferred that the BaFX type crystal have many $F^+(X^-)$ centers corresponding to vacant lattice points of $X^-$ ions since they increase the efficiency of stimulated emission in the wavelength region of 600 to 700 nm. In that case, F is often slightly in excess of X.

While omitted from the formula (II), one or more additives such as bA, $wN^I$, $xN^{II}$ and $yN^{III}$ may be incorporated into the phosphor of the formula (II), if needed. In the above, A is a metal oxide such as $Al_2O_3$, $SiO_2$ or $ZrO_2$. In order to prevent $M^{II}FX$ particles from sintering, the metal oxide preferably has low reactivity with $M^{II}FX$ and the primary particles of the oxide are preferably super-fine particles of 0.1 μm or less diameter. In the above, $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds are preferably halides.

In the above description, b, w, x and y represent amounts of the additives incorporated into the starting materials, provided that the amount of $M^{II}FX$ is assumed to be 1 mol. They are numbers satisfying the conditions of $0 \leq b \leq 0.5$, $0 \leq w \leq 2$, $0 \leq x \leq 0.3$ and $0 \leq y \leq 0.3$, respectively. These numbers by no means represent the contents in the resultant phosphor because the additives decrease during the steps of firing and washing performed thereafter. Some additives remain in the resultant phosphor as they are added to the materials, but the others react with $M^{II}FX$ or are involved in the matrix.

In addition, the phosphor of the formula (I) or (II) may further comprise, if needed, Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetra-fluoro-borate compounds; hexafluoro compounds such as monovalent or divalent salts of hexa-fluorosilicic acid, hexafluoro-titanic acid and hexa-fluorozirconic acid; or compounds of transition metals such as V, Cr, Mn, Fe, Co and Ni. The phosphor usable in the invention is not restricted to the above, and any phosphor that can be essentially regarded as rare earth activated alkaline earth metal fluoride halide stimulable phosphor can be used.

The phosphor layer can be formed, for example, in the following manner. First, the above energy-storing phosphor particles and a binder are dispersed and dissolved in an appropriate organic solvent to prepare a coating solution. The ratio between the binder and the phosphor in the solution ordinarily is in the range of 1:1 to 1:100 (binder: phosphor, by weight), preferably 1:8 to 1:40 (by weight). As the binder dispersing and supporting the phosphor particles, various resin materials are generally known. The binder used for preparing the phosphor layer of the invention may be optionally selected from known resins. The organic solvent may be also optionally selected from known solvents. The coating solution may contain various additives such as a dispersing aid to assist the phosphor particles in the formation of dispersion, a plasticizer for enhancing the bonding between the binder and the phosphor particles, an anti-yellowing agent for preventing the layer from undesirable coloring, a hardening agent, and a cross-linking agent.

The prepared coating solution is then evenly coated on a surface of the continuous support, and dried to form the energy-storing phosphor layer. The coating procedure can be carried out by an ordinary means such as a doctor blade, a roll coater or a knife coater. The thickness of the phosphor layer is determined according to various conditions such as characteristics of the desired storage panel and the mixing ratio between the binder and the phosphor, but generally is in the range of 20 μm to 1 mm, preferably in the range of 50 to 500 μm.

The energy-storing phosphor layer may be a single layer or may consist of two or more sub-layers. The sub-layers may have different composition. For example, they may differ in the phosphor (in regard to the compound or the particle size) or in the ratio between the phosphor and the binder.

It is not necessary to form the phosphor layer directly on the support. For example, the phosphor layer beforehand formed on another substrate (temporary support) may be peeled off and then fixed on the support with an adhesive.

The energy-storing phosphor layer may be formed by a vapor-phase process such as vapor-deposition method. In that case, a rigid support is preferably used in place of the flexible support. The rigid support can be made of the same material in the same shape as the rigid plate described later.

On the energy-storing phosphor layer, a protective layer is preferably provided to ensure good handling of the storage panel in transportation and to avoid deterioration. The protective film is preferably transparent so as not to prevent the stimulating light from coming in or not to prevent the emission from coming out. Further, for protecting the storage panel from chemical deterioration and physical damage, the protective layer preferably is chemically stable, physically strong, and of high moisture proof.

The protective layer can be provided, for example, by coating the phosphor layer with a solution in which a transparent organic polymer (e.g., cellulose derivatives, polymethyl methacrylate, fluororesins soluble in organic solvents) is dissolved in a solvent, by placing a beforehand prepared film for protection (e.g., a film of organic polymer such as polyethylene terephthalate) on the phosphor layer with an adhesive, or by depositing vapor of inorganic compounds on the phosphor layer. Various additives may be contained in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a cross-linking agent (e.g., polyisocyanate). The thickness of the protective layer is generally in the range of about 0.1 to 20 μm.

For enhancing the resistance to staining, a fluororesin layer may be provided on the protective layer. The fluororesin layer can be formed by coating the surface of the protective layer with a solution in which a fluororesin is dissolved (or dispersed) in an organic solvent, and by drying the coated solution. The fluororesin may be used singly, but a mixture of the fluororesin and a film-forming resin is ordinarily employed. In the mixture, an oligomer having polysiloxane structure or perfluoro-alkyl group can be further added. In the fluororesin layer, fine particle filler may be incorporated to reduce blotches caused by interference and to improve quality of the resultant image. The thickness of the fluororesin layer generally is in the range of 0.5 to 20 μm. For forming the fluororesin layer, additives such as a cross-linking agent, a film-hardening agent and an anti-yellowing agent can be used. In particular, the cross-linking agent is advantageously employed to improve durability of the fluororesin layer.

Thus, a continuous phosphor sheet basically comprising a support, an energy-storing phosphor layer and a protective layer is prepared. On the protective layer of the phosphor sheet, the protective sheet is provided via a removal adherent layer. As described above, the protective sheet has a 25% compression hardness in the range of 0.005 to 0.4 MPa, and preferably is light and strong against impact and contact such as rubbing. The protective sheet is as large as or slightly larger than the protetive layer, as shown in FIG. 3, and generally has a thickness in the range of 0.5 to 5 mm.

The protective sheet is provided, for example, by the steps of laminating a releasable double-sided adherent film as the adhesive layer on the protective layer of the continuous phosphor sheet, and then fixing thereon a sheet of the above-described material; or by the steps of coating the protective layer with a proper adhesive to form the releasable adhesive layer, placing thereon a sheet of the above-described material, and then pressing and/or heating the sheet to fix. Otherwise, an adhesive film having a releasable surface on its adhesive layer as the protective sheet may be directly placed, pressed and/or heated to be fixed on the protective layer of the phosphor sheet.

Thus produced continuous phosphor sheet comprising the protective sheet provided thereon is then cut to give a number of phosphor sheets each of which is equipped with the protective sheet. Thus obtained phosphor sheets are temporarily piled up.

On the support of the phosphor sheet, a rigid plate is preferably provided. The rigid plate can improve levelness of the storage panel. Particularly in the case where radiation image information is read out in the line-scanning system comprising a condenser lens and a line sensor, it is desired that the rigid plate be provided. That is because the distance between the storage panel surface and the lens, through which light emitted from the storage panel is focused on the photo-receiving face of the line sensor, is required to be kept as constant as possible.

The rigid plate has a rigidity Y satisfying the condition of preferably $Y \geq 64$, more preferably $Y \geq 760$. The rigidity Y is defined by the formula:

$$Y = Et^3 / \rho(1-2\sigma)$$

in which $\rho$, $\sigma$, E and t stand for density, Poisson's ratio, Young's modulus and thickness of the rigid plate, respectively. The Young's modulus E of the rigid plate is preferably 40 GPa or more. The phosphor sheet-side surface of the rigid plate preferably has a degree of levelness in the range of 50 $\mu$m or less.

The rigid plate can be made of magnesium, aluminum, titanium, iron, nickel, alloy thereof, glass, quartz, rigid resin, carbon fiber-reinforced plastic (CFRP) or composite material thereof. The rigid plate may be a simple plate of the above material, but may have various other structures. For example, it may be a board of honeycomb structure, a laminate of the films made of the same or different materials, or a laminate in which a honeycomb board is sandwiched between two simple plates. Generally, the rigid plate is slightly larger than the phosphor sheet and has a thickness of 0.5 to 20 mm.

The rigid plate can be fixed onto the support of the phosphor sheet via a double-sided adherent film or an adhesive layer.

In the above-described manner, the radiation image storage panel of the invention shown in FIG. 1 can be produced.

The radiation image storage panel of the invention can be also produced in the following manner. First, the aforementioned continous phosphor sheet is cut to obtain many sized phosphor sheets. The protective layer of the phosphor sheet is covered with the protective sheet, and then the phosphor sheets are temporarily piled up. (In the pile, a protective sheet on the protective layer of one phosphor sheet is in contact with the support of the above-placed next phosphor sheet.) The rigid plate is fixed onto the support of each phosphor sheet in the above manner. Finally, the protective sheet of the phosphor sheet is fixed on the rigid plate with a peelable adhesive tape, as shown in FIG. 3.

Thus, a radiation image storage panel of the invention can be prepared. The storage panel of the invention may be in known various structures. For example, in order to improve the sharpness of the reproduced image, at least one of the sheets or layers may be colored with a colorant which does not absorb the stimulated emission but the stimulating light.

In the storage panel of the invention, another phosphor layer comprising a phosphor which absorbs radiation and emits ultraviolet or visible light may be provided next to the energy-storing phosphor layer. Examples of that phosphor include phosphors of $LnTaO_4$:(Nb, Gd) type, $Ln_2SiO_5$:Ce type and LnOX:Tm type (Ln is a rare earth element); CsX (X is a halogen); $Gd_2O_2S$:Tb; $Gd_2O_2S$:Pr,Ce; $ZnWO_4$; $LuAlO_3$:Ce; $Gd_3Ga_5O_{12}$:Cr,Ce; and $HfO_2$.

EXAMPLE 1

(1) Preparation of Phosphor Sheet

1) Formation of Energy-Storing Phosphor Layer

Tetradecahedral Particles of Stimulable Phosphor:

| | |
|---|---|
| $BaF(Br_{0.85}I_{0.15})$:Eu [mixture of particles of mean particle sizes (Dm) 6 $\mu$m and 3 $\mu$m in the weight ratio of 5:5] | 1,000 g |
| Binder: polyurethane elastomer [MEK solution (solid content: 13 wt. %) of Pandex T5265H, Dainippon Ink & Chemicals, Inc.] | 182 g |
| Cross-linking agent: polyisocyanate resin [Colonate HX (solid content: 100%), Nippon Polyurethane Co., Ltd.] | 3 g |
| Anti-yellowing agent: epoxy resin [Epicoat #1001 (solid), Yuka Shell Epoxy] | 6.7 g |
| Colorant: ultramarine [SM-1, Daiichi Chemical Industry Co.,, Ltd.] | 0.02 g |

The above-mentioned materials were placed in 47 g of methyl ethyl ketone, and mixed and dispersed at 1,000 rpm for 30 minutes by means of a propeller mixer to prepare a coating solution having a viscosity of 4 Pa·s (binder/phosphor:1/20, by weight). With the coating solution, a continuous polyethylene terephthalate (PET) sheet (support, thickness: 188 $\mu$m, haze: approx. 27, Lumilar S-10, Toray Industries, Inc.) was coated to form a layer of the solution (width: 460 mm). The layer of the solution was then dried to form an energy-storing phosphor layer (thickness: 300 $\mu$m).

2) Formation of Protective Layer

| | |
|---|---|
| Polymer material: fluoroolefin-vinylether copolymer [Lumiflon LF-504X (30% xylene solution), Asahi Glass Co., Ltd.] | 76 g |
| Organic filler: fine particles of melamine-formaldehyde [mean particle size: 1.2 $\mu$m, Epostar S12, Nippon Shokubai Co., Ltd.] | 11 g |
| Crosslinking agent: polyisocyanate [Sumijule N3500 (solid content: 100%), Sumitomo Bayer Urethane, Inc.] | 7.5 g |

-continued

| | |
|---|---|
| Coupling agent: acetoalkoxyaluminum diisopropinate [Plane-act Al-M, Ajinomoto Co., Inc.] | 0.1 g |
| Catalyst: dibutyltin dilaurate [KS1260, Kyodo Yakuhin Co., Ltd.] | 0.25 mg |

The above-mentioned materials were placed in 38 g of methyl ethyl ketone, and mixed and dispersed to prepare a coating solution. With the coating solution, the energy-storing phosphor layer was coated by means of a doctor blade. The formed layer of the solution was dried to form a protective layer (thickness: 2 $\mu$m).

Thus prepared continuous phosphor sheet in the form of a roll was cut in the size of 430 mm×430 mm, to obtain a number of sheets.

(2) Installation of Protective Sheet

On the protective layer of each phosphor sheet, a foamed polyethylene sheet of the same size (protective sheet, thickness: 2 mm, 25% compression hardness: 0.09 MPa, white PE-LITE of 15P, INOAC Corporation) was laminated. The phosphor sheets were then temporarily piled up.

(3) Attachment of Rigid Plate

A double-sided adherent sheet (double-sided tape 8161, Scotch, Sumitomo 3M) was laminated on the support of the phosphor sheet (on the side opposite to the protective sheet), and then cut for the phosphor sheet to provide an adhesive layer. After a release film was peeled from the double-sided adherent sheet, a polished aluminum sheet (rigid plate, material: A7075, size: 450 mm×450 mm, average thickness: 10 mm, degree of levelness: 20 $\mu$m) was placed and fixed.

(4) Fixation of Protective Sheet

The position of the protective sheet, which had been already placed on the protective layer of the phosphor sheet, was adjusted again, and then fixed on the rigid plate with an adhesive tape.

Thus, a radiation image storage panel of the invention was produced (see FIG. 3).

EXAMPLE 2

The procedure of Example 1 was repeated except for making the following changes, to produce another radiation image storage panel of the invention. Successively after the protective layer was formed on the continuous phosphor sheet in the form of roll, a less adherent film (protective sheet, Scotch 330, Sumitomo 3M) was laminated thereon. The continuous phosphor sheet thus provided with the protective sheet was then cut to give plural plates. The rigid plate was then provided on each plate (see FIG. 1).

Comparison Example 1

The procedure of Example 1 was repeated except for not providing the protective sheet, to produce a conventional radiation image storage panel comprising a rigid plate, a support, an energy-storing phosphor layer and a protective layer.

Evaluation of Radiation Image Storage Panel

With respect to each prepared radiation image storage panel, the resistance to scratches and bruises on the protective layer was evaluated in the following manner.

1) Scratches Caused in Production

Immediately after the storage panel was produced, the protective sheet was removed from the panel. The bared protective layer was then observed with the naked eyes, to count the number of scratches on the protective layer. Five or less scratches are practically acceptable.

2) Bruises Produced

Immediately after the storage panel was produced, the protective sheet was removed from the storage panel. The bared protective layer was then observed visually, to count the number of bruises on the protective layer. Five or less bruises are practically acceptable.

3) Screwdriver-dropping Test

In order to evaluate damage caused in installation on the apparatus of built-in type, a screwdriver was dropped onto the protective layer-side surface of the radiation image storage panel. After the protective sheet was removed from the panel, the bared protective layer was observed with the naked eyes under a fluorescent lamp to check whether the protective layer was damaged or not.

The results are set forth in Table 1.

TABLE 1

| | Ex. 1 | Ex. 2 | Com. Ex. 1 |
|---|---|---|---|
| Scratches | 2 | 0 | 8 |
| Bruises | 0 | 3 | 7 |
| Screwdriver-dropping test | not damaged | — | seriously damaged |

The results shown in Table 1 clearly indicate that the radiation image storage panels of the invention (Examples 1 and 2), which were provided with a protective sheet, suffered only such few scratches or bruises that the performance was not essentially deteriorated. In contrast, on the conventional storage panel (Comparison Example 1), more than five scratches or bruises were caused to impair the performance. Further, while the storage panel of Example 1 was not damaged in the screwdriver-dropping test, the panel of Comparison Example 1 was damaged so seriously that it could be no longer used.

What is claimed is:

1. A radiation image storage panel comprising a flexible support, an energy-storing phosphor layer, and a protective sheet overlaid in order, wherein the protective sheet has a 25% compression hardness in the range of 0.005 to 0.4 MPa and is releasable from the phosphor layer without giving damage to the phosphor layer.

2. A radiation image storage panel comprising a rigid plate, a flexible support, an energy-storing phosphor layer, and a protective sheet overlaid in order, wherein the protective sheet has a 25% compression hardness in the range of 0.005 to 0.4 MPa and is releasable from the phosphor layer without giving damage to the phosphor layer.

3. A radiation image storage panel comprising a rigid support, an energy-storing phosphor layer, and a protective sheet overlaid in order, wherein the protective sheet has a 25% compression hardness in the range of 0.005 to 0.4 MPa and is releasable from the phosphor layer without giving damage to the phosphor layer.

4. The radiation image storage panel according to one of claims 1 to 3, wherein a transparent protective layer is provided between the phosphor layer and the protective sheet under the condition that the transparent protective layer is bonded to the energy-storing phosphor layer and is releasable together with the phosphor layer from the protective sheet.

5. The radiation image storage panel according to one of claims 1 to 3, wherein the protective sheet is made of elastic material or foamed resinous material.

6. The radiation image storage panel of one of claims 1 to 3, wherein the protective sheet is a sheet of elastic material, foamed elastic material, foamed polyurethane, or foamed polyolefin.

7. The radiation image storage panel according to one of claims 1 to 3, wherein the protective sheet has a thickness in the range of 0.5 to 5 mm.

8. The radiation image storage panel according to one of claims 1 to 3, wherein the protective sheet has an adhesive layer on the side facing the phosphor layer which is released together with the protective sheet when the protective sheet is released from the phosphor layer.

9. The radiation image storage panel of claim 2, wherein both of the protective sheet and the rigid plate are larger than each of the support and the phosphor layer under such conditions that peripheral areas of the protective sheet and rigid plate extend beyond peripheries of the support and phosphor layer, and the protective sheet and the rigid plate are combined using an adhesive tape placed on the peripheral areas.

10. The radiation image storage panel of claim 3, wherein both of the protective sheet and the rigid support are larger than the phosphor layer under such conditions that peripheral areas of the protective sheet and rigid support extend beyond periphery of the phosphor layer, and the protective sheet and the rigid support are combined using an adhesive tape placed on the peripheral areas.

\* \* \* \* \*